(12) United States Patent  (10) Patent No.: US 7,309,072 B2
Storm  (45) Date of Patent: Dec. 18, 2007

(54) WATER CADDY

(76) Inventor: David B. Storm, 534 E. Broad St., Cookeville, TN (US) 38501

( * ) Notice: Subject to any disclaimer, the term of this patent is extended or adjusted under 35 U.S.C. 154(b) by 0 days.

(21) Appl. No.: 11/021,218

(22) Filed: Dec. 23, 2004

(65) Prior Publication Data
US 2006/0138737 A1 Jun. 29, 2006

(51) Int. Cl.
B62B 1/16 (2006.01)
(52) U.S. Cl. ......................... 280/79.2; 4/604
(58) Field of Classification Search .. 280/47.34–47.35, 280/79.11, 79.2, 79.5, 653, 659, 47.41, 47.26; 248/128–130, 133, 139; 4/627, 644, 547, 4/559, 483, 604
See application file for complete search history.

(56) References Cited

U.S. PATENT DOCUMENTS

| 460,888 | A | * | 10/1891 | Royle ........................ 248/133 |
| 748,704 | A | * | 1/1904 | Crane ...................... 294/68.26 |
| 760,540 | A | | 5/1904 | Lancaster |
| 1,367,896 | A | | 2/1921 | Simpson |
| 1,728,132 | A | | 9/1929 | Norton |
| 2,850,052 | A | | 9/1958 | Solie |
| 2,898,148 | A | | 8/1959 | Fewster |
| 3,055,482 | A | | 9/1962 | Stenzel |
| 3,562,821 | A | | 2/1971 | Queen |
| 3,616,467 | A | | 11/1971 | Drain |
| 3,711,872 | A | | 1/1973 | Jarosinski |
| 3,805,305 | A | | 4/1974 | Lunblad |
| 3,830,543 | A | | 8/1974 | Kostman |
| 3,888,424 | A | | 6/1975 | Chapman |
| 3,900,902 | A | | 8/1975 | Jarosinski |
| 3,930,630 | A | * | 1/1976 | Wulff ........................ 248/129 |
| 4,099,272 | A | | 7/1978 | Sowder |
| 4,106,132 | A | | 8/1978 | Warren |
| 4,112,524 | A | | 9/1978 | Johansson |
| 4,118,810 | A | | 10/1978 | Brickhouse et al. |
| 4,160,292 | A | | 7/1979 | Kuether et al. |
| 4,287,619 | A | | 9/1981 | Brewer et al. |
| 4,340,981 | A | | 7/1982 | Vanags |
| 4,497,077 | A | * | 2/1985 | Provost ........................ 4/628 |
| 4,680,817 | A | | 7/1987 | Sloan et al. |
| 4,796,312 | A | | 1/1989 | Corlew |
| 4,802,709 | A | * | 2/1989 | Jones ........................ 298/10 |
| 4,974,268 | A | | 12/1990 | Cors et al. |
| 4,986,717 | A | | 1/1991 | Cummins et al. |
| 4,989,917 | A | | 2/1991 | Schmidt, Jr. |

(Continued)

Primary Examiner—Christopher P. Ellis
Assistant Examiner—Vaughn T. Coolman
(74) Attorney, Agent, or Firm—Knox Patents; Thomas A. Kulaga

(57) ABSTRACT

A water caddy for capturing, containing, transporting, and emptying a fluid includes an open top fluid container pivotally attached to a cabinet set on wheels. The fluid container is pivotable between a fill position in which the container receives fluid through the open top and an empty position in which fluid is emptied from the container through the open top without having to lift any portion of the cabinet. A pneumatic actuator interconnecting the cabinet and fluid container assists the user in emptying the fluid container by urging the fluid container toward its empty position. The water caddy 10 may be dimensioned to enable a user to conveniently empty captured fluid directly into an existing floor toilet. One or more brakes are employed to inhibit inadvertent movement of the water caddy as it is being filled or emptied.

5 Claims, 4 Drawing Sheets

U.S. PATENT DOCUMENTS

| | | | |
|---|---|---|---|
| 5,146,647 A | 9/1992 | Blase et al. | |
| 5,680,661 A * | 10/1997 | Foster et al. | 5/618 |
| 5,813,062 A | 9/1998 | Vago et al. | |
| 5,926,866 A | 7/1999 | Chao | |
| 5,961,002 A | 10/1999 | Taylor et al. | |
| 5,978,983 A | 11/1999 | Queen et al. | |
| 6,196,634 B1 | 3/2001 | Jurinek | |
| 6,220,148 B1 | 4/2001 | Pearce et al. | |
| 6,279,195 B1 | 8/2001 | Biggs | |
| 6,283,170 B1 * | 9/2001 | Robinson | 141/1 |
| 6,516,477 B1 | 2/2003 | Storm | |
| 6,705,621 B1 | 3/2004 | Drayer | |
| 2003/0052465 A1 * | 3/2003 | Ahmed et al. | 280/79.5 |

* cited by examiner

WATER CADDY

FIELD OF THE INVENTION

The present invention relates generally to fluid transportation devices. More particularly, the present invention relates to a water caddy with a hinged fluid container to enhance use.

BACKGROUND OF THE INVENTION

It is well known that water, and fluids in general, are relatively heavy. A single gallon of water, for example, weighs about 8.35 pounds, which makes the task of collecting, containing, and transporting fluids difficult. A variety of fluid handling devices are available to help contain and move fluids. Unfortunately, many such devices are uniquely configured for specific applications and have little if any utility in applications for which the device was not intended. U.S. Pat. No. 6,705,621 to Drayer, for example, describes a wheeled water caddy designed for lifting and transporting a specific type of closed water container. While the Drayer water caddy may simplify the process of transporting closed water containers, it has essentially no utility in applications where an open-top container is needed for capturing, containing, transporting, and emptying water. A filled mop bucket, for example, could not be easily transported or emptied with the Drayer water caddy. Nor would the Drayer water caddy be of much use to institutional care facilities that have a need to capture, transport, and empty waste water from shower chairs.

What is needed, therefore, is an improved water caddy that eliminates or improves upon one or more disadvantages of existing water caddy devices.

BRIEF SUMMARY OF THE INVENTION

The present invention achieves its objections by providing a water caddy having a cabinet with a cabinet bottom, a cabinet top, and a cabinet interior intermediate the cabinet top and bottom. An open top fluid container pivotally attached to the cabinet is pivotable between a fill position in which the container receives fluid through its open top and an empty position in which fluid is emptied from the container through the open top without having to lift any portion of the cabinet. The water caddy is preferably set on wheels to enhance its mobility.

To assist a user in emptying fluid, one or more mechanical storage devices, such as a pneumatic actuator, interconnect the cabinet and fluid container and urge the container toward its empty position.

Other features that may employed include a brake to inhibit rotation of one or more of the wheels, a container latch for latching the fluid container to the cabinet, and a caddy latch for latching the water caddy to an existing shower apparatus.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
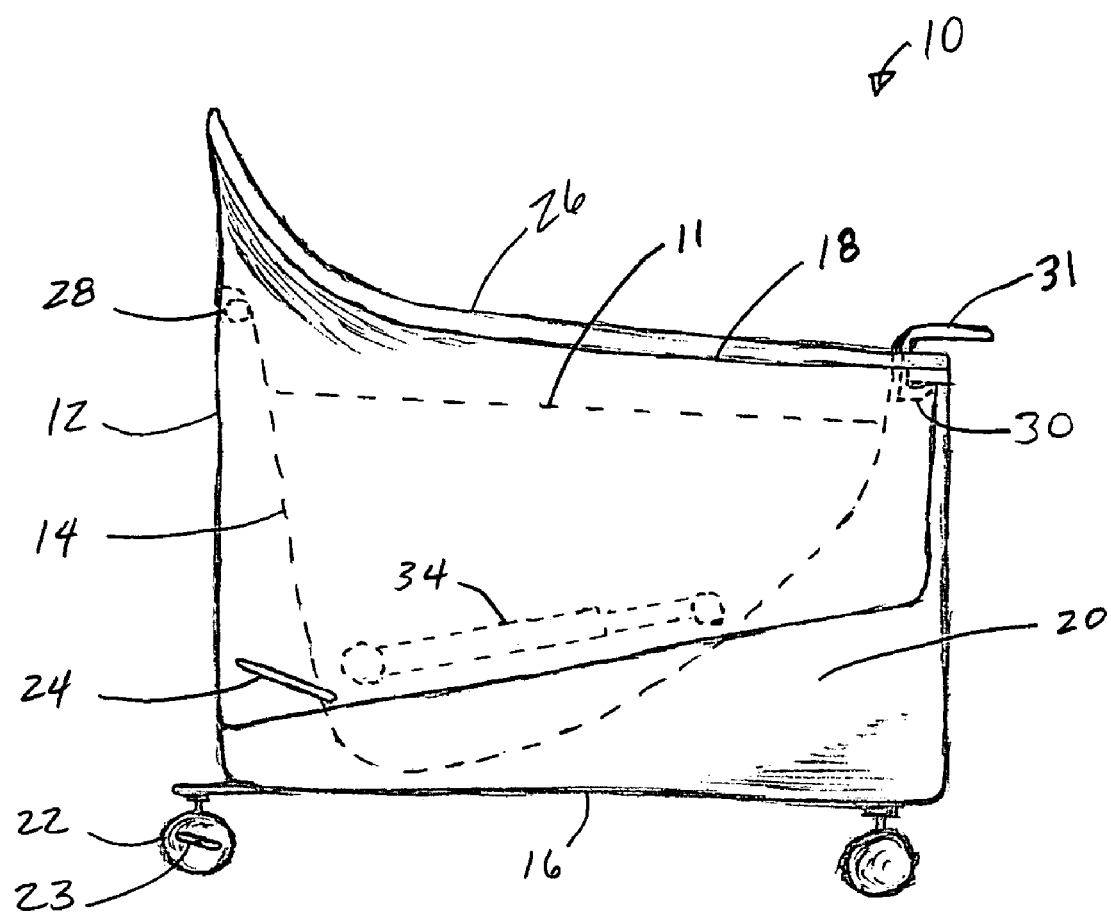
FIG. 1 is a side view of a water caddy with the fluid container in its fill position according to the invention.
Figure 2:
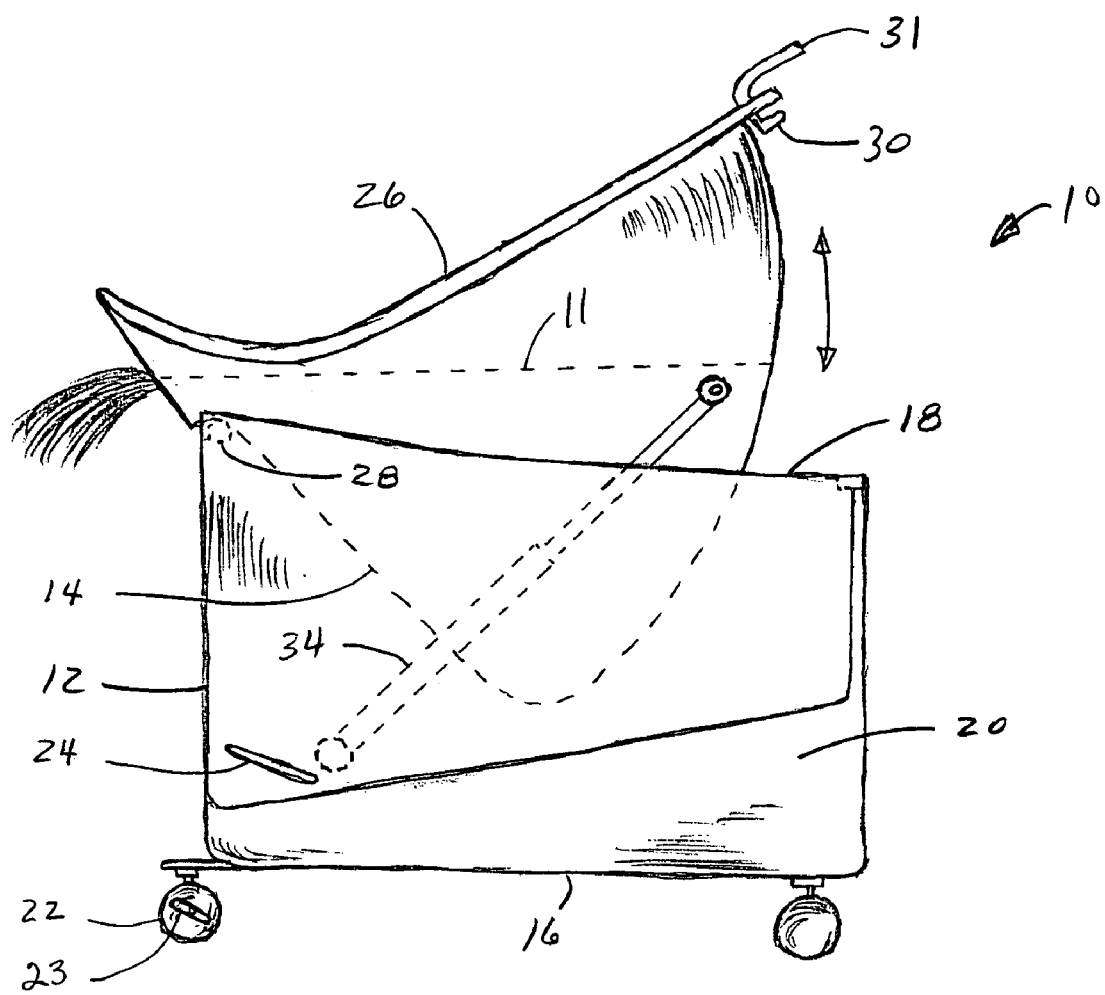
FIG. 2 is a side view of the water caddy of FIG. 1 with the fluid container in its empty position.
Figure 3:
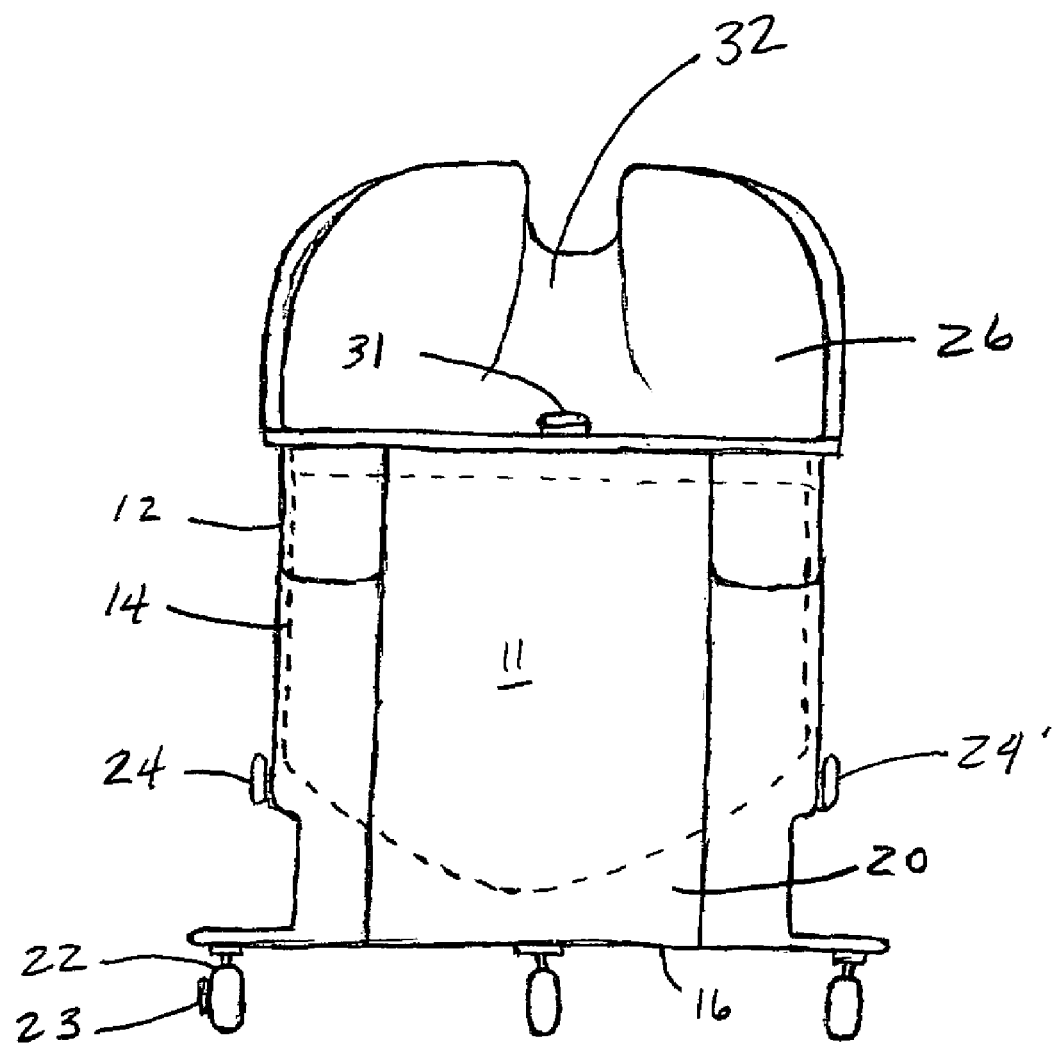
FIG. 3 is a front view of the water caddy of FIG. 1.

Turning now to the drawings wherein like reference characters indicate like or similar parts throughout, FIGS. 1-3 illustrate a water caddy 10 for capturing, containing, transporting, and emptying a fluid 11. The water caddy 10 has an outer shell or cabinet 12 supporting an open top fluid container 14. The cabinet 12 includes a cabinet bottom 16, a cabinet top 18 with an opening for receiving at least a portion of the fluid container 14, and a cabinet interior 20 intermediate the cabinet top 18 and bottom 16. To enhance mobility, a plurality of wheels 22, preferably in the form of castered rollers/wheels, are attached to the cabinet 12. In the embodiment shown in FIGS. 1-3, three wheels 22 are employed. However, additional wheels may be employed as desired or needed. Preferably, one or more brake control levers 23 for operating brakes are provided to inhibit rotation of one or more wheels 22, and thereby inhibit inadvertent movement of the water caddy 10, such as when the fluid container 14 is receiving and emptying fluid 11.

The fluid container 14 has an open top 26 and is pivotally attached to the cabinet 12 by a hinge 28 or other such pivoting device, thus enabling the fluid container 14 to be pivotable between a fill position (as shown in FIG. 1) in which the fluid container 14 may be filled with fluid 11 received through the open top 26, and an empty position (as shown in FIG. 2) in which fluid 11 is emptied from the container through the open top 26. A container latch 30 and associated latch handle 31 may be provided to latch the fluid container 14 in its fill position and to serve as a handle to assist a user in pivoting the fluid container 14.

In use, the fluid container 14 captures or otherwise receives fluid 11 from a fluid source, such as a water faucet or other form of fluid supply. After filling, the water caddy 10 may be rolled or otherwise transported to a location where the contained fluid 11 is to be dumped. In a preferred embodiment, the cabinet 12 and fluid container 14 are dimensioned to enable captured fluid 11 to be emptied into an existing floor toilet. Alternatively, captured fluid 11 may be emptied into a floor drain or other disposal means. To dump the fluid 11, the user lifts upwardly on the latch handle 31 with sufficient force to pivot the fluid container 14 about hinge 28. As shown in FIG. 3, a channel 32 is preferably formed along the inner surface of the fluid container 14 to assist in directing the flow of fluid 11 as it empties from the fluid container 14. Brake control lever 23 can be engaged to inhibit inadvertent movement of the water caddy 10. Thus, the water caddy 10 is configured to enable a user to empty captured fluid 11 without having to lift any portion of the cabinet 12. By "cabinet", what is meant is a structural assembly configured to carry and support the fluid container 14. The cabinet 12 may be either closed with contiguous upstanding walls, floor, and top, or the cabinet 12 may be open and merely consist of a structural support frame.

It will be appreciated that the water caddy 10 provides a highly stable and mobile platform for use and transport of fluids. Hinge 28 acts to support much of the weight of the fluid 11 and provides leverage for emptying of the fluid container 14. Hinge 28 also provides lateral stability to the fluid container 14 as it is being emptied, which simplifies the process of emptying the fluid container 14 and reduces the likelihood of spillage.

To further reduce the amount of effort required to empty the fluid container 14, one or more mechanical energy storage devices 34 may be employed to assist the user in pivoting the fluid container 14. In a preferred embodiment, device 34 is a pneumatic actuator interconnecting the cabinet 12 and fluid container 14 in a way that urges the fluid container 14 upwardly toward its empty position. Mechanical energy storage device 34 also functions to enhance lateral stability of the fluid container 14.

Between filling and emptying of the fluid container 14, the fluid 11 may be used or otherwise worked as desired. For example, the fluid 11 may be in the form of a cleaning solution that is used for mopping floors. Or the fluid 11 may be mixed with other fluids or materials to form a desired mixture. In such applications, the water caddy 10 provides a highly stable, easy to use mobile platform from which the fluid 11 may be used or worked.

Figure 4:
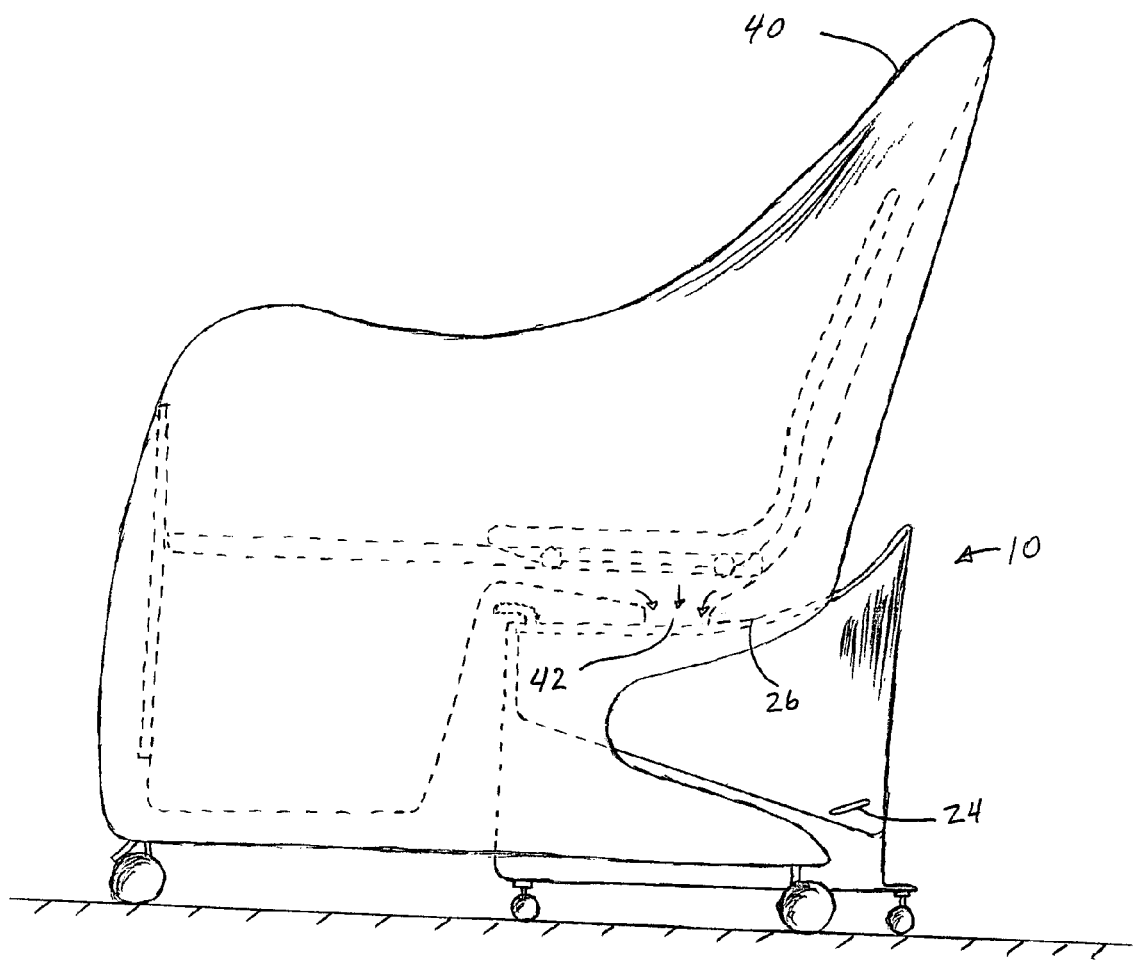
FIG. 4 is side view of a shower apparatus employing a water caddy according to the invention.

FIG. 4 shows a further application where the water caddy 10 may be used to capture waste water from a shower apparatus 40. The particular shower apparatus 40 shown in FIG. 4 is that which is described in U.S. Pat. No. 6,516,477, issued Feb. 11, 2003 and entitled "Shower Apparatus For Seated Occupant," the entire contents of which are hereby expressly incorporated by reference for the purpose of disclosing the configuration and operation of the exemplary shower apparatus 40. As an occupant of the shower apparatus 40 is showered, waste water exits the apparatus 40 by way of a through opening 42 positioned below where the occupant sits. Waste water that exits through opening 42 is received through the open top 26 of fluid container 14 when the water caddy 10 is positioned below the through opening 42 as shown in FIG. 4. Brake control lever 23 is preferably engaged to inhibit inadvertent movement of the water caddy 10 as it is receiving waste water from the shower apparatus 40. When the occupant finishes showering, the water caddy 10 and its captured waste water can be easily and conveniently rolled to an existing floor toilet where the waster water is emptied into the toilet by pivoting the fluid container 14 as described above. A caddy latch control lever 24 is preferably provided to disengage an optional caddy latch that latches the water caddy 10 to the shower apparatus 40. The caddy latch is preferably spring-loaded and automatically latches the water caddy 10 to the shower apparatus 40 when the water caddy 10 is wheeled into position.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A water caddy for receiving waste from a shower apparatus, said water caddy comprising:
   a cabinet dimensioned and configured to be received by an opening in the shower apparatus, said cabinet including:
   a cabinet bottom having a plurality of wheels configured to allow said cabinet to move along a surface supporting said cabinet, at least one of said plurality of wheels having a lock configured to selectively prevent said at least one of said plurality of wheels from rotating;
   a cabinet top in opposed relation to said cabinet bottom, said cabinet top defining an opening that is encircled by said cabinet top; and
   a cabinet interior intermediate the cabinet top and cabinet bottom, said cabinet interior enclosed by a shell;
   a fluid container pivotally attached to said cabinet, said fluid container being pivotable between a fill position in which the container receives fluid through an open top of the fluid container and an empty position in which fluid is emptied from the container through the open top without having to lift any portion of the cabinet, said open top receiving waste from the shower apparatus when said fluid container is in said fill position, said open top of said fluid container having a channel configured to allow fluid to flow out of said fluid container when in said empty position, said fluid container having a back dimensioned and configured to clear said cabinet top when said fluid container is moved between said fill position and said empty position;
   a pivot between a front of said fluid container and said cabinet top, said pivot providing lateral support to said fluid container in said empty position, said channel in said fluid container adjacent said pivot;
   a container latch positioned adjacent the back of said fluid container, said container latch securing said fluid container to said cabinet;
   a handle for lifting the back of said fluid container;
   a cabinet latch attached to said shell of said cabinet, said cabinet latch configured to engage the shower apparatus when said cabinet is received by said shower apparatus; and
   one or more mechanical energy storage devices interconnecting the cabinet and fluid container for urging the container toward said empty position.

2. The water caddy of claim 1 wherein said one or more mechanical energy storage devices includes a pneumatic actuator.

3. The water caddy of claim 1 wherein said plurality of wheels includes one or more castered rollers.

4. A water caddy for receiving waste from a shower apparatus, said water caddy comprising:
   a fluid container having an open top and a spout positioned at a first end of said open top, said fluid container having a substantially vertical wall adjacent said first end, said fluid container having a outwardly sloping wall adjacent a second end that is opposite said first end;
   a cabinet substantially enclosing said fluid container below said open top when said fluid container is in a first position;
   a pivot connecting said first end of said fluid container to said cabinet, said pivot configured to allow said fluid container to move between said first position and a second position, said fluid container in said second position when said second end is elevated away from said cabinet, said outwardly sloping wall of said fluid container dimensioned to clear said cabinet when said fluid container moves between said first and second positions, said spout of said fluid container dimensioned and configured to allow fluid contained in said fluid container to be discharged into a toilet;
   a container latch configured to secure said second end of said fluid container to said cabinet;

a handle attached to said fluid container adjacent said second end;

a cabinet latch configured to secure said cabinet to the shower apparatus when said cabinet is received by said shower apparatus;

at least one mechanical energy storage device interconnecting said cabinet and said fluid container for urging said container toward said second position, said at least one mechanical energy storage device supporting said fluid container in said second position; and a plurality of wheels attached to said cabinet for enhancing mobility of the water caddy, at least one of said plurality of wheels being lockable, said plurality of wheels configured to allow said cabinet to move above a supporting surface.

5. The water caddy of claim 4 wherein said one or more mechanical energy storage devices includes a pneumatic actuator.

* * * * *